(12) United States Patent
Waitz

(10) Patent No.: US 11,803,101 B2
(45) Date of Patent: Oct. 31, 2023

(54) METHOD FOR SETTING THE FOCUS OF A FILM CAMERA

(71) Applicant: QINEMATIQ GMBH, Vienna (AT)

(72) Inventor: Martin Waitz, Vienna (AT)

(73) Assignee: QINEMATIQ GMBH, Vienna (AT)

(*) Notice: Subject to any disclaimer, the term of this patent is extended or adjusted under 35 U.S.C. 154(b) by 0 days.

(21) Appl. No.: 17/280,472

(22) PCT Filed: Sep. 26, 2019

(86) PCT No.: PCT/AT2019/060316
§ 371 (c)(1),
(2) Date: Mar. 26, 2021

(87) PCT Pub. No.: WO2020/061604
PCT Pub. Date: Apr. 2, 2020

(65) Prior Publication Data
US 2022/0035226 A1 Feb. 3, 2022

(30) Foreign Application Priority Data
Sep. 26, 2018 (AT) ............... A 60156/2018

(51) Int. Cl.
*G03B 13/20* (2021.01)
*G03B 13/30* (2021.01)
(Continued)

(52) U.S. Cl.
CPC ............. *G03B 13/20* (2013.01); *G03B 13/30* (2013.01); *G03B 13/36* (2013.01); *G06F 18/21* (2023.01); *G06F 18/24* (2023.01); *G06T 7/11* (2017.01); *G06T 7/246* (2017.01); *G06T 7/50* (2017.01); *G06V 10/40* (2022.01); *G06V 20/10* (2022.01); *H04N 13/271* (2018.05); *H04N 23/67* (2023.01);
(Continued)

(58) Field of Classification Search
CPC ................................ G03B 13/20; G03B 13/36
See application file for complete search history.

(56) References Cited

U.S. PATENT DOCUMENTS

| 2,746,368 A | * | 5/1956 | Weiss | G03B 13/20 396/141 |
| 10,368,057 B1 | * | 7/2019 | Saran | H04N 9/045 |

(Continued)

FOREIGN PATENT DOCUMENTS

| EP | 2947510 A1 | 11/2015 | |
| WO | WO-2012126868 A1 | * 9/2012 | G02B 7/285 |

OTHER PUBLICATIONS

WO-2012126868 Machine English Translation, download from WIPO Patentscope.*

*Primary Examiner* — Minh Q Phan
(74) *Attorney, Agent, or Firm* — Dykema Gossett PLLC

(57) ABSTRACT

Aspects of the present disclosure are directed to a method for setting the focus of a film camera. In one embodiment, for example, the method includes the steps of: obtaining distance information from a measuring device arranged in a region of the film camera, the measuring device producing a real image and a depth image; setting the focus of the film camera using the obtained distance information; producing a real image which is augmented with depth information from the measuring device; and calculating the real image into the image of the film camera by means of an image transformation.

26 Claims, 2 Drawing Sheets

(51) Int. Cl.
  *G03B 13/36* (2021.01)
  *H04N 13/271* (2018.01)
  *H04N 23/67* (2023.01)
  *G06T 7/50* (2017.01)
  *G06T 7/11* (2017.01)
  *G06T 7/246* (2017.01)
  *G06V 10/40* (2022.01)
  *G06V 20/10* (2022.01)
  *G06F 18/21* (2023.01)
  *G06F 18/24* (2023.01)
(52) U.S. Cl.
  CPC . *H04N 23/671* (2023.01); *G06T 2207/20021* (2013.01)

(56) References Cited

U.S. PATENT DOCUMENTS

2016/0088212 A1* 3/2016 Narang .............. H04N 5/44504
                                                        348/348
2018/0176439 A1* 6/2018 Thumpudi ........... H04N 5/2356

* cited by examiner

METHOD FOR SETTING THE FOCUS OF A FILM CAMERA

CROSS-REFERENCE TO RELATED APPLICATIONS

This application is a national stage filing based upon International application No. PCT/AT2019/060316, filed 26 Sep. 2019, which claims the benefit of priority to Austria application No. A 60156/2018, filed 26 Sep. 2018.

BACKGROUND

The present invention relates to a method for setting the focus of a film camera, in which distance information is obtained by means of a measuring device arranged in the area of the film camera, which distance information is used for setting the focus of the film camera.

In order to improve the focus setting of a film camera, measuring devices are used on a case-by-case basis that assign distance data to different image areas. This allows an operator to select an image area, for example, in order to effect a focus adjustment on this image area.

It is known from AT 511 312 B1 that a depth image can be generated with a stereoscopic camera arrangement in order to thereby control the focus of a camera. The real image of the measuring camera and the depth image of the measuring camera are displayed on a touch PC or monitor. By manual selection of an image area or by automated tracking, the distance can be measured in this area and subsequently the focus of the film or TV camera is adjusted.

Disadvantages of the known solution are:

The cameraman cannot operate a touch PC or other monitor during his activity (guiding the camera, adjusting the image area) in order to draw the focus independently.

The video image of the measuring device has a different perspective and image area than the image of the film camera. The cameraman or focus assistant cannot see exactly which subjects are in the scene because the image areas (perspectives) of the auxiliary camera and film camera are different.

The image of the real camera cannot be viewed on the TouchPC, i.e. the result of the focusing process cannot be seen. The focus assistant therefore needs a second auxiliary monitor (the video assist 3a) in order to also view the image of the real camera.

It can also be seen that if a 3D sensor, e.g. a stereoscopic measuring device, is placed next to the film camera 1, the real image of the measuring device will always show a different image section than the image of the film camera 1. Since the image of the measuring device is often more wide-angled than the image of the film camera 1, this has the advantage that an operator can already measure objects before they enter the image of the film camera 1. However, there is the fundamental disadvantage that the operator cannot see how the film material is recorded. For this, he would need a second monitor at the measuring device, which displays the image of the film camera 1, wherein he must always look back and forth between the monitor of the measuring device and the so-called video assist (or viewfinder).

On the other hand, the following disadvantages arise if the image from the film camera 1 were used to track (automatically follow) an image area:

Film lenses have a low range of field depth. They also display desired areas in the image very blurred. However, if image areas are out of focus, tracking cannot be performed in these areas because objects in the video image cannot be detected and analyzed. If the focal plane wants to be moved from area A to area B, this may not be possible because area B is not detected.

Often the images of a film camera 1 are exposed in such a way that only certain subjects are shown illuminated, other image areas are kept in the dark and are poorly visible or not visible at all in the real image.

Due to this disadvantage, the image of the film camera is not suitable for a tracking algorithm. Thus, the image of a film camera cannot be used for video tracking.

SUMMARY OF THE INVENTION

It is the object of the present invention to avoid these disadvantages and to provide a method by which the focusing of a film camera can be improved.

According to the invention, this object is solved by the measuring device producing a real image on the one hand and a depth image on the other hand, producing therefrom a real image augmented with depth information and calculating this into the image of the film camera by means of an image transformation.

This makes it possible for a cameraman or focus assistant to see the real image of the film camera in the viewfinder, video assist or other monitor. In this image a video tracking algorithm can run which tracks and follows arbitrary subjects. Each image area of this real image shall be assigned a distance value. It should be possible to select or automatically track image areas on which the focus of the film camera is controlled by the distance values.

An essential feature of the method according to the invention is that the real image of the measuring device is of high resolution and has a large depth of field. This makes it possible to establish a match with the image of the film camera and to create a mapping of the image elements so that the individual pixels of one image are assigned corresponding pixels of the other image. This makes it possible to compensate for the unavoidable parallax that results due to the different position of the film camera and the measuring device. Ultimately, this is an image transformation in which the image of the film camera could be reconstructed from the real image of the measuring device if it were not present. Excluded from this transformation are only pixels that are covered in an image by an object in front of it. However, if the distance between the film camera and the measuring device is not too great, the proportion of such pixels is relatively small. Since the real image of the measuring device is previously augmented with distance information from the depth image, this depth information can thus also be transferred to the image of the film camera.

An essential feature of the present invention is that, with the transformation, there is an exact correspondence in perspective between the view of the film camera and the view of the measuring device, and thus depth information is assigned to each (or at least to a sufficient number of) pixels of the real image of the film camera. A depth image of the film camera is obtained by this method.

This allows particularly efficient methods for automatic focusing, but also enables representations not previously available in this way, with which manual or semi-automatic focusing can be made much easier.

It is particularly preferred that the real image of the measuring device has a large depth of field, preferably covering the entire range of distances to be expected for the shot. In this way, focusing can be performed efficiently even if the focus of the film camera at the relevant moment differs significantly from the distance of the object that is ultimately to be focused on. This also applies when the aperture of the film camera is fully open and, accordingly, the depth of field is shallow.

Particularly advantageous support for the user is made possible when the real image of the measuring device is displayed on a first display device, in which distance information is superimposed. This takes advantage of the property of the real image that typically the entire image area can be displayed in sharp focus. However, such a display will generally only be in addition to that of the film camera image, since it is usually desirable to see exactly what the film camera records, including the blurring of objects outside the depth-of-field range.

Alternatively or in addition to this, it is possible for the image of the film camera to be displayed on a further display device, in which distance information is superimposed. In this way, the exact section in question is always displayed without any parallactic distortion.

However, the display can also be done by fading in (overlay), which is possible in a useful manner by precise perspective assignment in the correct position.

According to a particularly preferred embodiment of the present invention, it is provided that the distance information is related to the focus setting of the film camera. This means, for example, that objects in front of the focal plane are highlighted in one color and objects behind the focal plane are highlighted in another color, wherein the color intensity and/or shading can vary depending on the distance from the focal plane.

Automatic focusing can be realized particularly advantageously by tracking objects in the real image of the film camera. Tracking objects outside the depth-of-field range is normally considerably more difficult or impossible due to the blurring. Due to the perspective correspondence between the image of the film camera and the real image of the measuring device, tracking can be carried out without any problems even in the out-of-focus area, since the image recognition processes or the like are carried out on the real image of the measuring device and then the results are transferred to the image of the film camera.

Preferably, image transformation is performed by image recognition and feature detection algorithms with translation, rotation, distortion correction and scaling of views. The advantage of this is that no calibration is required for configuration changes.

As an alternative thereto, it can be provided that the image transformation is carried out by presetting the geometric and optical parameters of the film camera and the measuring device and arranging them relative to each other. This can reduce the required computing power.

A particularly advantageous embodiment variant of the invention provides that, on the basis of the depth information, areas of the image of the film camera are combined into elements of groups, each of which can be selected separately. Due to the three-dimensional detection, the pixels belonging to certain real objects, such as, for example, a person, can be grouped particularly efficiently.

The formation of groups is possible not only because of the depth information, but also because of the real image, e.g. a group "eyes" (as elements of the groups).

Using the real image and depth data of the measuring device, image areas can be divided into groups and marked in the image. These groups or elements of the groups are included and displayed as an overlay in the image of the film camera with perspective accuracy. An operating device can select a group or switch between groups. A tracking algorithm can be started based on this selection. Due to the stored depth data, the distances of the group elements to the film camera are known, on which the focus can be adjusted.

In addition, the markings, identifications and distance information determined in the measuring device can be included and superimposed as a layer in the image of the film camera with perspective accuracy.

Efficient processing of the data can be achieved by linking image data and depth data from the film camera with a time code signal and storing them together.

The present invention also relates to a device for adjusting the focus of a film camera, wherein a measuring device is arranged in the area of the film camera to obtain distance information usable for adjusting the focus of the film camera.

According to the invention, this device is characterized in that the measuring device consists of a real image camera and a depth camera, which are fixedly arranged on a common carrier.

Particular variability and flexibility can be achieved by detachably attaching the carrier to the film camera. Due to the possibility of bringing about the correspondence between the real image of the measuring device and the image of the film camera by means of image recognition processes, it is not essential to adjust the position of the carrier precisely in relation to the film camera and to check it again whenever, for example, the optics are changed.

In the measuring device or as a separate device there is a computing unit which produces the real image of the measuring device (7) augmented with the depth information. This computing unit has the possibility to run algorithms of image processing.

The device according to the invention can also provide that markings and the corresponding distance values can be selected by an operating device and processed further at the operating device.

In order to achieve the greatest possible depth of field and uniform illumination of the real image, it is preferably provided that the real image camera has an image sensor with HDR function (High Dynamic Range Image). In this case, a compensation of large brightness differences is carried out by known methods. It is important for the processing according to the invention that the depth-of-field range in the real image of the measuring device is sufficiently large. It is advantageous if the real image sensor has an HDR function in order to display the real image of the measuring device with a reasonably uniform illumination so that no information is lost.

It can also be provided that the real image camera has a small sensor and/or small aperture. The choice of aperture and the focus setting are optimally selected so that the entire area of interest can be sharply imaged. In the case of film recordings, for example, this can be an area in front of the camera between 40 cm and INF.

Preferably, a video overlay unit can also be provided in order to include the real image of the measuring device in the image of the film camera. The video overlay unit has an input for the data from the measuring device, the operating devices and the film camera. The data can be output to the display device. The video overlay unit is installed in the measuring device, in the film camera or in the display device or mounted as a separate device at the film camera.

Preferably, it can be provided that the measuring device is arranged on a lens hood of the film camera. A lens hood is a device that is usually arranged on the lens of the film camera. Its purpose is to reduce or prevent the incidence of stray light into the lens, such as sunlight or light from light sources obliquely behind or next to the camera. Such lens hoods, sometimes called compendiums or matte boxes, often have adjustable flaps (French flags).

The measuring device can thus be placed very close to the film camera, where it does not interfere and forms a compact unit with it. This enables a space-saving embodiment with a simple structure. In this case, the measuring device can be integrated in the lens hood. Particularly preferably, the lens hood has a square outer frame, wherein the measuring device is arranged in the region of at least one corner of the outer frame. The outer frame is arranged along the axis of the lens of the film camera at the end of the lens hood facing away from the film camera.

BRIEF DESCRIPTION OF THE DRAWINGS

In the following, the present invention will be explained in more detail with reference to the embodiments shown in the figures, wherein.

DETAILED DESCRIPTION

Figure 1:
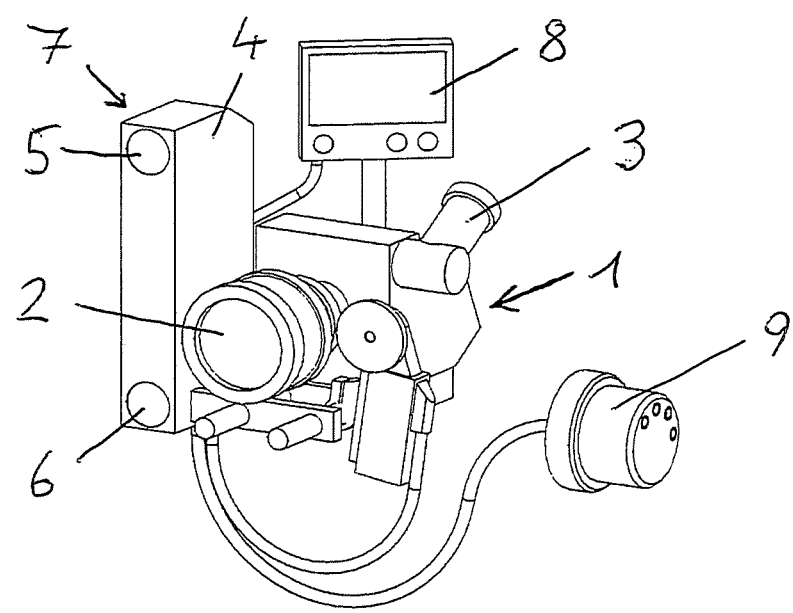
FIG. 1 shows a schematic representation of the device according to the invention.

The device of FIG. 1 consists of a film camera 1 with a lens 2 and a viewfinder 3. A carrier 4 is detachably attached to the film camera 1, which carries a real image camera 5 and a depth camera 6. These are arranged vertically one above the other in the position of use. The position of use is the usual position of the film camera 1 in which the long side of the rectangular image is horizontal. Thus, the connecting line between the real image camera 5 and the depth camera 6 is perpendicular to the long side of the rectangular image and thus of the sensor of the film camera 1.

The carrier 4 including the real image camera 5 and the depth camera 6 is a measuring device 7 which allows enriching image information with distance information. Thereby, distance information is assigned to each pixel (or sufficiently many pixels) of the real image.

A touch PC 8 as a display device enables the display of various representations that facilitate automatic or, in particular, manual focus control. Another operating device 9 with a rotary control can also be used for control.

Figure 2:
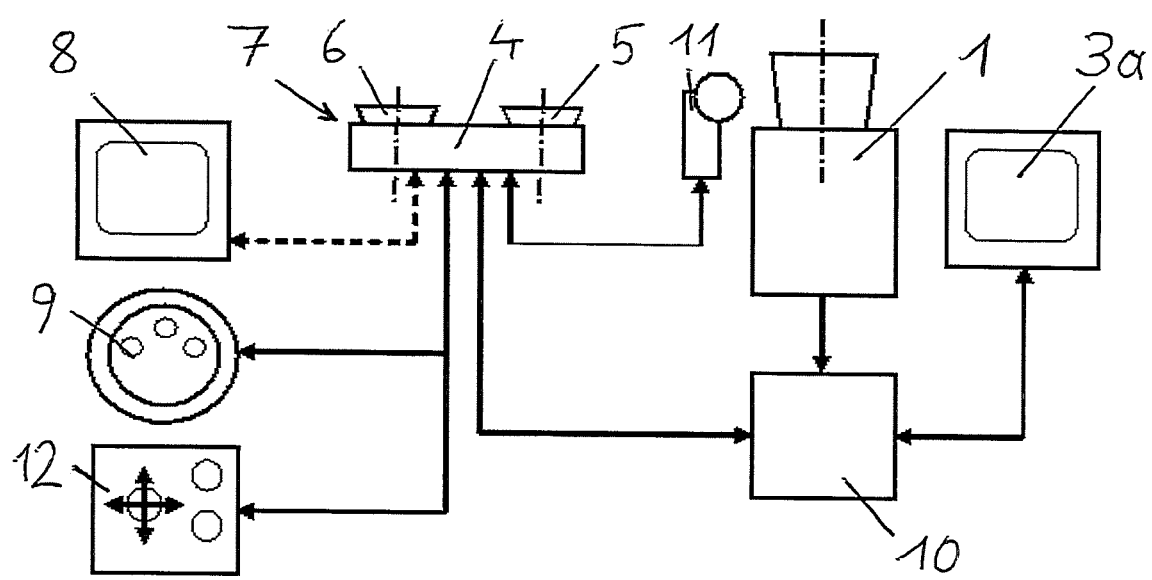
FIG. 2 shows a diagram explaining the configuration of the device.

FIG. 2 shows the logical interconnection of the individual components. The film camera 1 is in communication with a video overlay unit 10 to transmit the image to it. The video overlay unit 10 also receives image and distance information from the measuring device 7 so that the image from the film camera 1 can be matched in correct position with the real image from the real image camera 5 and the depth image from the depth camera 6 of the measuring device 7.

At the same time, a servo motor 11 on the film camera 1 can be controlled via the measuring device 7 to control the focus adjustment.

Various operating devices are designated 8, 9 and 12, namely a touch PC 8, another operating device 9 with a rotary control and an operating device 12 with a joystick.

The viewfinder 3 can optionally be supplied with the desired displays. Alternatively or in addition to the viewfinder 3, a screen can be provided as video assist 3a.

In the following, typical properties and features of the individual components are explained in key words.

Measuring Device 7:

It generates a matrix of distance values using a 3D sensor, also commonly referred to here as a depth camera 6. The 3D sensor consists of a stereoscopic camera array, TOF camera, laser scanner, lidar sensor, radar sensor or combination of different 3D sensors to improve the measurement quality, range and resolution.

The measuring device 7 has a video camera which generates a real image and which is therefore referred to here as real image camera 5. The 3D sensor and the real image camera 5 are mechanically fixed to each other and calibrated. The display perspectives are the same. Thus, a distance value can be assigned to each recognizable pixel of the video camera. This assignment is called depth image. Preferably, this real image camera 5 has an infinitely large depth-of-field range in order to be able to sharply depict all objects in the image. Preferably, this video camera has a large exposure range (e.g. through an HDR mode) in order to be able to image subjects of different brightness uniformly.

The measuring device 7 consists of the depth camera 6 (3D sensor) and the real image camera 5 as measuring unit and a computer unit for processing the measuring results. Preferably, the measuring unit and the computing unit are in the same housing. However, they can also exist as separate units.

The measuring device 7 is arranged on a film or television camera (here film camera 1) in such a way that it can be brought into correspondence with the image of the film camera 1, namely that the image of the film camera 1 is contained in a partial area of the real image camera 5.

The field of view of the measuring device 7 is very wide-angled and usually larger than the field of view of the film camera 1.

The measuring device 7 is detachably arranged on or near the film camera 1.

Preferably, the optical axes of the real image camera 5 of the measuring device 7 and the film camera 1 are parallel.

A control device is preferably implemented in the measuring device and/or an interface is provided for the focus motor or all three lens motors (focus, iris, zoom) of the film camera 1.

There may be an IMU (Inertial Measurement Unit) in the measuring device 7, which is used to calculate the spatial position of the measuring device 7.

In the measuring device 7, tracking algorithms for automated tracking of objects in the video image are executed through analyses of video images. Also, the closest point to the film camera 1 can be calculated.

In the measuring device 7, image areas can be divided into groups using the available real image and depth data.

Using the available real image information, features can be extracted from images by image recognition algorithms. Such features can be eyes, faces of people, entire persons or various predefined objects. For example, all faces can be divided into elements of the group "face" and marked with a frame in the real image.

Due to the available depth information, contiguous image areas can be defined in elements of a group and color-coded depending on the distance. Areas of 1-2 m, for example, are displayed in red, areas of 2-3 m in blue, and so on.

Due to the depth information available, contiguous image areas with a regular depth profile can form an element of a group. For example, a floor has a regular depth profile as long as it is sufficiently flat and no objects are lying on the floor. Therefore, the group element "Floor" can be formed in the image and combined as a single image object and marked in the real image.

Video Overlay Unit 10:

The video overlay unit 10 has interface input and output for the video image of the film camera 1, allowing a video image to be read in and output again.

The video overlay unit 10 has an interface input for the real image and the depth image of the measuring device 7.

The real image of the measuring device 7 is included in the perspective of the image of the film camera 1 by transformation. The transformation can be performed in the following ways:

Automatically by image recognition/feature detection.
The basis of this transformation is detection of features (Feature Detection), wherein matches are searched for in both images. The transformation of the image of the measuring device into the image of the film camera is performed by
translation,
rotation,
distortion correction, and
scaling of the two video images on the basis of image features which are found in both images. Theoretically, three identical image features are sufficient, preferably several features distributed over the image, which are detected in both images. This type of transformation has the advantage that the image perspectives are automatically aligned when the lens of the film camera is changed without manual interaction.

Semi-automatic by entering the geometric and optical parameters.

The image transformation between the real image of the film camera and the images of the measuring device can also be carried out by a purely mathematical shift, if
the distances and
the alignment of the optical center,
the distances between the image sensors, and
the image sections of the optics
are entered. A simple image transformation and thus an incorrect match of the perspective can also be achieved with only two or three of the parameters listed.

Manually by nesting the representations of the real image of the film camera with the real image or depth image of the measuring device on a monitor.

The transformation can also be calculated from when the two real images are displayed graphically and shifted on top of each other by manual graphical manipulations on the screen (shift, rotate, tilt, scale).

Since there is a direct correlation between the depth image and the real image of the measuring device 7, this transformation of the real images also establishes a correlation between the pixels of the image of the film camera 1 and their distance. Thus, a depth image of the image of the film camera 1 is realized.

The image of the film camera 1, the real image of the measuring device 7 and the depth image of the measuring device 7 can be displayed together as an overlay, or only individual layers of the overlay are displayed.

Additional information can be placed over the image of the film camera 1 as another overlay layer.

Markings, labeled image areas and the position of the tracking points or tracking areas, cursors, etc. are also included in the video image of the main camera as a perspective-accurate overlay by the transformation, and can thus be displayed and checked. Even if the image of the film camera 1 is blurred or too dark, these markings, labels and tracking functions can still run correctly because they are calculated in the background using the real image of the measuring device.

Groups or elements of a group and the labeling (marking) of these can be included in the real image of the film camera by the image transformation with exact perspective.

These image groups are displayed in the real image in color, by shading, marked as a pattern or enclosed in a frame as an overlay.

By coloring the pixels, a colored overlay can be placed over the image of the film camera. In such representations, the image of the film camera 1 is ideally executed as a grayscale image.

Each distance of a pixel or image area gets its own color coding. This provides depth information for the image of the film camera 1.

The depth-of-field range is included as an overlay in the video image of the film camera 1 and can be displayed. Those pixels/image points of the film camera 1 that lie in the focus area are marked in color. This corresponds to a conventional focus peaking function for video cameras.

Each pixel or image area of the image of the film camera 1 can be given its own color representation depending on the distance to the focal plane. This color marking can be displayed as an overlay. This makes it possible to see at a glance which areas are in the focal plane and what distance image areas are from the focal plane. This function is called Visual Focus Peaking. It is similar to the focus peaking function in traditional video cameras or cameras, where only the pixels that lie in the focal plane are marked. In contrast to this, the distance of all other pixels can also be displayed in color.

The distance of an image area can also be displayed in different section lines. In this case, a horizontal or vertical line is placed in the video image. Depending on the distance of the corresponding pixel on this intersection line, a bar is used to show how far the corresponding pixel is from the focal plane. Pixels in front of the focal plane are drawn with a bar above the intersection line, pixels behind the focal plane are drawn with a bar below the intersection line. The result is a histogram that shows the distance of the pixels from the focal plane.

The video image of the film camera 1 can be tilted in the display perspective by linking it to the depth information. In this representation, the focal plane can be superimposed and it is easy to see how the image areas are spatially related to the focal plane.

General settings and information of the measuring device are included in the video image of the film camera 1 as an overlay and can be displayed.

The thus processed and enhanced image of the film camera 1 is displayed on a video assist monitor 3a or in the video viewfinder 3 of the film camera 1.

The thus processed image of the film camera, real image of the measuring device 7 and the depth image can also be output to a touch PC, on which image areas are selected, stored and retrieved manually or automatically.

The processed image of the film camera 1 can be linked to a time code signal and stored. This means that the real image and the depth information of the film camera 1 are available at any defined time.

This video overlay unit is preferably located in the measuring device 7 or the video assist 3a and is a part thereof.

Video Assist 3a and/or Viewfinder 3:

The video assist 3a or the viewfinder 3 are display elements for the image of the film camera 1.

Video assist 3a or viewfinder 3 can have a touchscreen and/or control buttons on which the measuring device 7 can be controlled directly. In this way, it is also possible to select an image area on which to focus.

Control Unit 9, 12:

The control unit 9, 12 has a control element for setting the focus. Turning/shifting causes a shift of the focal plane in space.

The control unit 9, 12 has a control element for adjusting a focus ramp.

These two control options can be one element or two elements.

The control element, preferably a haptic control element (e.g. slider, rotary knob) has an adjustment path and two stops. The two stops are designated as the start value and end value.

Focal planes (distances) can be assigned to the control element. Thus, the start value is assigned focal plane A and the end value is assigned focal plane E.

Focal plane A and focal plane E can be distances, tracking areas, image areas, etc.

Different focus levels (A1, A2, A3, . . . , E1, E2, . . . ) can be assigned to the start value or end value of the control element. This can be done by pressing a button or by other operation.

Therefore, the initial value and the final value are not fixed distance values, but variable distance planes in space. Thus, plane A & E can be derived from the tracking algorithm.

For example, plane A can also be the set value from the manual control element, and plane E can be derived from the tracking algorithm.

The control unit has switches or buttons for switching between an automatic focusing mode and a manual focusing mode.

In automatic mode, a focal plane A is assigned to the start value and a focal plane B is assigned to the end value. A shift/rotation of the control element causes a shift of the focal plane. The speed of the rotation/shifting determines how fast the focus should move from the initial value to the final value, i.e. from plane A to plane E. The control element is thus not used to change the distance manually, but controls a time how the focus should move in space (=control of a focus ramp).

In known controllers, control elements (usually a rotary knob for adjusting the focal plane) have two fixed distances at the start value and end value of the rotary travel. For example, the focus can be moved from 1 m to 10 m in space. In contrast, variable focal planes are assigned to the start value and end value here. These variable planes can be, for example, two tracking points of two different subjects. The subjects can naturally move in space, so they always change the distance to the camera. Thus, the operator is actually no longer pulling the focus in distance, but only controlling the timing of how long and when the focus should be at the new endpoint. He is thus relieved of the difficult task of permanently "knowing" (estimating) the correct distance to the end subject. He can devote himself exclusively to the temporal course of the focus ramp, which leads to artistically more interesting results.

In manual mode, the focal planes are fixed values. A corresponding distance corresponds to the adjustment path. A rotation/shift causes a shift of the focal plane in space.

The operating device has operating elements or switches for setting, retrieving and deleting tracking points or markers or for moving a cursor on the video image.

Operating elements or switches and control element can be distributed in one device or in several devices.

Control element can also be designed as a slider, joystick, sensor surface, touch screen or other actuator instead of a rotary knob The operating element can be used to position a cursor in the video image. This operating element can be a switch, joystick, touchpad, eye tracking of the user, gyroscope or other element to control x/y coordinates.

If the cursor is moved over the real image of the film camera, the corresponding distance value can be output or the focus position on the optics can be approached.

The control unit is connected directly to the measuring device via cable or radio link.

The control unit can also be connected to a lens control system, which in turn has a connection to the measuring device 7.

The control unit can additionally control the iris and/or zoom of the film camera 1.

The rotary knob has a motorized drive. This makes it possible to automatically turn the rotary knob to the corresponding distance position of the measuring device. The rotary knob therefore always has the position which corresponds to the current distance value of the measuring device.

The operating element can be used to select subjects or image groups from the video image/depth image in different ways:

Tracking points on the video assist 3a are approached with the cursor and set at the push of a button. The distance measurement can then run automatically.

The distance to a specific object is measured. Preferably, this object is located in the optical center of the main camera. At the push of a button on the control unit, this distance is stored and a tracking point is started. With the tracking point set, the object can then be automatically tracked and focused by image recognition on the real image. This means that the operator does not need to look at a monitor to set a tracking point and save or start automatic focusing.

Image feature recognition can be started via the control unit. These image features are, for example, eyes, faces or persons. These features are displayed in the video image of the main camera as an overlay. By switching, a feature can be selected and saved as a tracking point or a tracking can be started. The depth of field (DoF) range can be superimposed in the image of the film camera in the area of the plane of focus in color or represented by patterns by using the depth data that is correct in perspective for the image of the film camera. Only those pixels are marked which are in the DoF; the other pixels remain in the real representation.

Image feature recognition can be started via the operating device. These image features are, for example, eyes, faces or persons. By turning the rotary knob, the features corresponding to the corresponding distance are marked. This feature is selected and can be saved as a tracking point.

By turning the knob, the corresponding distances in the video image are marked in color. If only one image area in the video image is marked, it can be saved as a tracking point. If several image areas are marked in the video image, switching selects one area and saves it as a tracking point.

The elements of a group can be selected via the control unit. In this way, all elements can be selected in sequence. If an element is selected at the push of a button, the corresponding distance value can be output or the focus position can be determined. It is also possible to save this element as a tracking point or to start tracking based on this element.

It is particularly advantageous if the distance of a first group from a focal plane is assigned to a first stop of an operating device and that a further distance of a further group from the focal plane is assigned to a further stop of the operating device. In this case, the adjustment range of the operating device is dynamically adapted to the distance of the two groups, so that the focal plane can be continuously adjusted between the groups. However, it is also possible to link only one stop to the distance of a group.

The invention claimed is:

1. A method for setting the focus of a film camera including the steps of:
   obtaining distance information from a measuring device arranged in a region of the film camera;
   setting the focus of the film camera using the obtained distance information;
   the measuring device producing a real image by a camera of the measuring device and producing a depth image by a 3D sensor of the measuring device;
   producing a real image which is augmented with depth information by using the real image of the camera of the measuring device and the depth image of the 3D sensor via a computing unit of the measuring device; and
   calculating the real image of the measuring device which is augmented with depth information into the image of the film camera by means of an image transformation, wherein the film camera and the camera of the measuring device are separate devices and wherein the real image of the measuring device which is augmented with depth information and the real image of the film camera are separate images and the real image of the measuring device which is augmented with depth information is transformed into the real image of the film camera by means of the image transformation.

2. The method according to claim 1, characterized in that the real image of the measuring device has a large depth of field, which covers the entire distance range to be expected for the recording.

3. The method according to claim 1, characterized in that the real image of the measuring device is displayed on a display device, in which distance information is superimposed.

4. The method according to claim 1, characterized in that the image of the film camera, into which distance information is superimposed, is displayed on a display device.

5. The method according to claim 3, characterized in that the real image of the measuring device and the image of the film camera is displayed in a switchable manner or superimposed with perspective accuracy.

6. The method according to claim 3, characterized in that the distance information is related to the focus setting of the film camera.

7. The method according to claim 6, characterized in that the distance from each pixel or from contiguous image areas to a focal plane is superimposed in color, or represented by patterns, as an overlay.

8. The method according to claim 1, characterized in that objects are tracked in the image of the film camera.

9. The method according to claim 8, characterized in that the object tracking is performed on the real image of the measuring device and the results are transferred to the image of the film camera.

10. The method according to claim 1, characterized in that the image transformation is carried out by image recognition and feature detection algorithms with translation, rotation, distortion correction and scaling of the views.

11. The method according to claim 1, characterized in that the image transformation is carried out by presetting geometrical and optical parameters of the film camera and the measuring device and arranging them relative to one another.

12. The method according to claim 1, characterized in that the image transformation is carried out by manually nesting a display of the image of the film camera and the real image or the depth image of the measuring device on a display device.

13. The method according to claim 1, characterized in that, on the basis of the depth information, contiguous areas of the real image are combined to form elements of groups which are transferred to the image of the film camera and the groups can each be selected separately.

14. The method according to claim 13, characterized in that individual elements are selectable.

15. The method according to claim 12, characterized in that a distance of a first group from a focal plane is assigned to a first stop of a control unit, and in that a further distance of a further group from the focal plane is assigned to a further stop of the control unit.

16. The method according to claim 13, characterized in that individual elements or groups are tracked.

17. The method according to claim 1, characterized in that image data and depth data of the film camera are linked with a time code signal and stored together.

18. A device for adjusting the focus of a film camera, the device comprising:
   a measuring device arranged in a region of the film camera, the measuring device configured and arranged to obtain distance information and to adjust the focus of the film camera where the obtained distance information and the focus setting of the camera focus are not related, and
   wherein the measuring device includes a real image camera and a 3D sensor which are arranged fixedly on a common carrier, a computing unit configured and arranged to calculate and produce a real image which is augmented with depth information by using the real image of the camera and a depth image of the 3D sensor, and a video overlay unit configured and arranged to calculate the real image of the measuring device into an image of the film camera, wherein the film camera and the real image camera of the measuring device are separate devices and wherein the real image of the measuring device which is augmented with depth information and a real image of the film camera are separate images and the real image of the measuring device which is augmented with depth information is transformed into the real image of the film camera by means of an image transformation.

19. The device according to claim 18, characterized in that the common carrier is detachably attached to the film camera.

20. The device according to claim 18, characterized in that the real image camera of the measuring device includes an image sensor with High Dynamic Range Image function.

21. The device according to claim 18, further including a first display device configured and arranged to display the real image of the measuring device in which distance information is superimposed.

22. The device according to claim 21, further including a further display device configured and arranged to display the image of the film camera in which distance information is superimposed.

23. The device according to claim 18, further including a video overlay unit configured and arranged to calculate the real image of the measuring device into the image of the film camera.

24. The device according to claim 18, characterized in that the measuring device is arranged on a lens hood of the film camera.

25. The device according to claim 18, further including an operating element configured and arranged for setting the focus, the operating element has at least one stop associated with one distance of a group of picture elements.

26. A method for setting the focus of a film camera including the steps of:
   obtaining distance information from a measuring device arranged in a region of the film camera, the measuring device producing a real image and a depth image;
   setting the focus of the film camera using the obtained distance information;
   producing a real image which is augmented with depth information from the measuring device; and
   calculating the real image into the image of the film camera by means of an image transformation;
   wherein the image transformation is carried out by manually nesting a display of the image of the film camera and the real image or the depth image of the measuring device on a display device; and
   wherein a distance of a first group from a focal plane is assigned to a first stop of a control unit, and in that a further distance of a further group from the focal plane is assigned to a further stop of the control unit.

* * * * *